United States Patent [19]

Blount

[11] 4,357,460

[45] Nov. 2, 1982

[54] PROCESS FOR THE PRODUCTION OF POLYESTER SILICATE RESINOUS PRODUCTS

[76] Inventor: David H. Blount, 5450 Lea St., San Diego, Calif. 92105

[21] Appl. No.: 256,317

[22] Filed: Apr. 22, 1981

Related U.S. Application Data

[63] Continuation-in-part of Ser. No. 122,015, Feb. 19, 1980, which is a continuation-in-part of Ser. No. 10,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.$^3$ .............................................. C08G 63/00

[52] U.S. Cl. .................................... 528/271; 528/296; 528/301; 528/302; 528/306; 528/308; 528/309; 528/421; 525/28; 521/83; 521/154

[58] Field of Search ............... 528/271, 296, 301, 302, 528/306, 308, 309

[56] References Cited

U.S. PATENT DOCUMENTS

| | | | |
|---|---|---|---|
| 4,125,498 | 11/1978 | Blount | 260/18 S |
| 4,282,129 | 8/1981 | Blount | 528/26 |
| 4,303,768 | 12/1981 | Blount | 525/474 |

Primary Examiner—Melvyn I. Marquis

[57] ABSTRACT

By mixing and reacting an alkali metal silicate, a substituted monohydroxy organic compound and a polycarboxylic acid and/or polycarboxylic acid anhydride, polyester silicate resinous products are produced which may be utilized as molding powder, coating agent, etc.

17 Claims, No Drawings

PROCESS FOR THE PRODUCTION OF POLYESTER SILICATE RESINOUS PRODUCTS

CROSS-REFERENCE TO RELATED COPENDING APPLICATIONS

This application is a continuation-in-part of U.S. patent application, Ser. No. 122,015, filed Feb. 19, 1980, which is a continuation-in-part of U.S. patent application, Ser. No. 10,061, filed Feb. 7, 1979, now U.S. Pat. No. 4,200,697 which is a continuation-in-part of U.S. patent application, Ser. No. 794,915, filed May 9, 1977, now U.S. Pat. No. 4,125,498, which is a continuation-in-part of U.S. patent application, Ser. No. 653,727, filed Jan. 30, 1976, now abandoned, which is a continuation-in-part of U.S. patent application, Ser. No. 562,201, filed Apr. 14, 1975, now abandoned.

BACKGROUND OF THE INVENTION

This invention relates to a process for the production of polyester silicate resinous products by chemically reacting an alkali metal silicate, a substituted monohydroxy organic compound and a polycarboxylic acid and/or polycarboxylic acid anhydride by heating the mixture to a temperature just below the boiling temperature of the reactants.

The polyester silicate resinous products may be utilized as protective coating for wood, metal, plastics, linoleum, leather, fabrics and rubber. They may be utilized in paints, lacquers, metal primers, caulking compounds and water-emulsion paints. They may be copolymerized with a vinyl monomer to produce hard, solid, useful objects or they may be used in conjunction with a reinforcing filler such as fiberglas fiber, paper or cloth to produce a laminate of outstanding strength and durability which may be used as a molding powder, as an adhesive and as impregnants. They may be chemically reacted with polyisocyanates to produce polyurethane silicate resins and foams which may be used for thermal and sound insulation. They may also be reacted with epihalohydrins to produce epoxy silicate resins which may be cured with polyamines and used as adhesives, coating agents, etc.

The alkali metal silicates will react chemically with the monohydroxy organic compound, having a substituent which will split off during the reaction, and will react also with the polycarboxylic acid compounds. The unsaturated polyester silicates may be cured with a peroxide initiator.

Polyester silicate resinous products may be produced by reacting the following components:
(A) an alkali metal silicate;
(B) an organic monohydroxy compound having a substituent which will split off during the reaction;
(C) a polycarboxylic acid and/or a polycarboxylic acid anhydride.

Component A

Any suitable alkali metal silicate may be used in this invention, such as sodium silicate, potassium silicate, lithium silicate and mixtures thereof.

Sodium silicate is the preferred alkali metal silicate. An aqueous solution of alkali metal silicate may be used, but a fine granular alkali metal silicate is preferred.

Component B

Any suitable organic monohydroxy compound having a substituent which will split off during the reaction. The substituent can be halogen, acid sulfate, nitrate, acid phosphate, bicarbonate, sulfate, formate, acetate, propionate, laurate, oleate, stearate, and mixtures thereof.

The halohydrins are the preferred organic monohydroxy-substituted compound. Suitable halohydrins include the alkene halohydrins such as ethylene chlorohydrin, ethylene bromohydrin, glycerine α,γ dichlorohydrin and the like.

Aliphatic nitro alcohols are produced by reacting nitroalkanes with aldehydes or ketones in the presence of dilute alkali to produce compounds with the general formula of

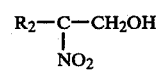

wherein R is an alkane. 2-nitro-1-hydroxy alkane compounds may be used. Nitro-phenols may be used.

Component C

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, fumaric acid, maleic acid, dimethylterephthalate and bis-glycol terephthalate.

Long-chain unsaturated alkali metal polyester silicate resins may be made from dibasic acids and dihydric alcohols. Either the dibasic acid or the dihydric alcohol may be unsaturated. Usually a combination of unsaturated and saturated dibasic acids and dihydric alcohols is used to produce the unsaturated polyester resins. Instead of the dibasic acids, the corresponding polycarboxylic acid esters of lower alcohols or their mixtures e.g. dimethylterephthalate and bis-glycol terephthalate, may be used for preparing the unsaturated polyester resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid. An unsaturated dibasic acid such as maleic acid, maleic acid anhydride, fumaric acid, itaconic acid or mixtures thereof must be included in the production of unsaturated alkali metal polyester silicate resins, except when an unsaturated alcohol is used.

A portion, up to 5 parts by weight, of the polycarboxylic acid and/or polycarboxylic acid anhydride may be replaced by polymerizable oils such as unsaturated fatty acids (or their esters), tung oil, linseed oil, heated linseed oil, soybean oil, dehydrated castor oil, tall oil, cottonseed oil, sunflower oil, fish oil, perilla oil, safflower oil and mixtures thereof. 10 to 30 parts by weight of polycarboxylic acid and/or polycarboxylic anhydride are used in this invention.

A portion, up to 5 parts by weight, of the polycarboxylic acid and/or polycarboxylic acid anhydride may be replaced with a linear organic carbonate selected from the group consisting of p-xylene glycol bis(ethyl carbonate), diethylene glycol bis(allyl carbonate) and mixtures thereof.

A portion, up to 5 parts by weight, of the substituted organic monohydroxy compound and polycarboxylic acid is replaced with an organic compound containing hydroxyl and carboxylic radicals, selected from the group consisting of 10-hydroxy undecanoic acid, 2-hydroxy decanoic acid, W-hydroxy pentadecanoic acid and mixtures thereof.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc. The vinyl monomer may be added in an amount of 20 to 50 percent by weight, percentage based on the weight of the polyester silicate resinous product.

Activators and promoters, used in conjunction with the initiators such as cobalt which, in the form of its ethyl hexanoate or naphthenate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitroso dimethylaniline or similar compounds which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate and mixtures thereof. The amount of organic peroxide needed to promote the catalytic reaction is quite varied; usually less than 1%, based on the weight of the reactants, is needed. Methyl ethyl ketone peroxide is added in an amount of 0.2 to 0.1% by weight, based on the polyester silicate resinous product.

Promoters used with acyl peroxide include tertiary dialkyl aryl amines, such as diethyl aniline, and aliphatic thiols like, for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention (activation of initiators by a reducing agent).

The alkali metal polyester silicate resinous product will react chemically with suitable polyisocyanates and/or polyisothiocyanates to produce resinous products and foams.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula

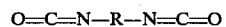

where R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate (sic),
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate, and
ethylene diisocyanate.

Other polyisocyanates, polyisothiocyanates and their derivatives may be equally employed. Fatty diisocyanates are also suitable and have the general formula

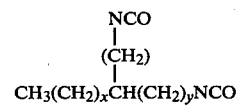

where x+y totals 6 to 22 and x is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenylpolymethylene-isocyanates obtained by aniline-formaldehyde condensation followed by phosgenation ("crude MDI"), and modified polyisocyanate containing carbodiimide groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkylsubstituted on the nucleus, with aldehydes or ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4; and methylene-bis-(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethaneprepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol, cyclohexanedimethanol (1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitriles in the presence of polyethers (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated or unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing poly(urethane silicate) resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Me_2OSiO_2$ (Me=alkali metal) is not critical and may vary within the usual limits, but is preferably between between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali meta metasilicate such as sodium metasilicate, potassium metasilicate and commercial dry granular sodium and potassium silicates. Heating is required to start the curing reaction.
6. Water containing 20% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methyl-morpholine; N-ethylmorpholine; N,N,N',N'-tetramethylenediamine; 1,4-diazo-bicyclo-(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyl-diethanolamine; and their reactive products with alkylene oxides, e.g., propylene oxide and/or ethylene oxide and mixtures thereof.
   (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds as described, e.g., in British Pat. No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action, are described in Kunststoff-Handbuch, Volume VII, published by Vieweg and Hochtlen, Carl-Hander-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The form stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, e.g., on pages 103 to 113. The halogenated paraffins and inorganic salts of phosphoric acid are the preferred fire-retarding agents.

The preferred curing agent is an aqueous solution of silicates, sodium silicate and/or potassium silicate in water, which are normally known as water glass. Aqueous solutions of silicates may be prepared in the form of 25% to 54% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorous, e.g., tributylphosphate; tris(2,3-dichloropropyl)-phosphate; polyoxypropylene-chloromethylphosphonate; cresyldiphenylphosphate; tricresylphosphate; tris-(betachloroethyl)-phosphate; tris-(2,3-dichloropropyl)-phosphate; triphenyl-phosphate; ammonium phosphate; perchlorinated diphenyl phosphate; perchlorinated terephenyl phosphate; hexabromocyclodecane; tribromophenyl; dibromopropyldiene; hexabromobenzene; octabromodiphenylether; pentabromotoluol; poly-tribromostyrol; tris-(bromocresyl)-phosphate; tetrabromobisphenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicate products.

The object of the present invention is to provide a novel process to produce polyester silicate resinous products. Another object is to produce polyester silicate resinous products which will react with an epihalohydrin compound to produce epoxy silicate resinous products. A further object is to produce polyester silicate resinous products which will react with polyisocyanates to produce resinous and foamed products that may be used as coating agents and thermal- and sound-insulation materials. Another object is to produce polyurethane silicate foamed products which have excellent flame-retardant properties.

DETAILED DESCRIPTION OF THE INVENTION

I have discovered that a polyester silicate resinous product may be produced by reacting an alkali metal silicate, a substituted monohydroxy organic compound and a polycarboxylic acid and/or a polycarboxylic acid anhydride.

The preferred method is to mix, simultaneously, Component A, an alkali metal silicate, Component B, a substituted monohydroxy organic, and Component C, a polycarboxylic acid and/or a polycarboxylic acid anhydride, then to heat the mixture to a temperature between the melting temperature of the polycarboxylic acid and the boiling temperature of the components while agitating for 20 to 90 minutes, thereby producing a polyester silicate resinous product.

The exact chemical reaction which takes place is not known, but appears to be as follows:

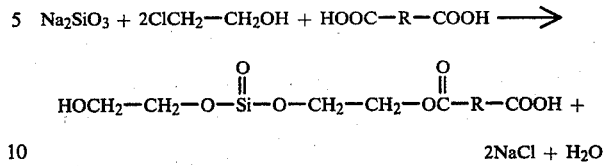

The polycarboxyl compound appears to act as a catalyst to promote the reaction of the halohydrin with the silicate.

The reactions of this invention may take place under any suitable physical conditions. While most of the reactions will take place at ambient pressure, in certain cases, a pressure either lower than, or above, ambient pressure may give better results. It may be preferable in certain cases to use temperatures above the components' boiling temperature after a partial reaction has taken place in order to speed up the chemical reaction. The temperature usually ranges between 100° C. and 250° C.

The ratios of the essential reactants and optional reactants which lead to the polyester silicate resinous product of this invention may vary, broadly speaking, within ranges as follows:

(A) 1 to 10 parts by weight of alkali metal;
(B) 10 to 30 parts by weight of a monohydroxyl organic compound having a substituent which will split off during the reaction;
(C) 10 to 30 parts by weight of a polycarboxylic acid and/or polycarboxylic acid anhydride.

Polyester silicates will react chemically with polyisocyanates and/or polyisothiocyanates to produce a polyurethane silicate resinous product or foam.

The preferred method to produce polyurethane silicate resinous or foam products is to mix thoroughly 1 to 95 parts by weight of the polyester silicate resinous product with 50 parts by weight of a polyisocyanate or polyisothiocyanate at a temperature between 20° C. and 45° C. and at a suitable pressure, preferably ambient, optionally adding catalyst (activator), foam stabilizers, blowing agent, polyols and fillers. The optical additives may be premixed with the suitable component. The blowing agent may be added with the polyester or polyisocyanate and the remaining additives are added with the polyester silicate resinous product.

The polyisocyanate may be reacted with a polyol to produce an isocyanate-terminated polyurethane prepolymer and used in place of, or with, the polyisocyanate to react with the polyester silicare to produce a polyurethane silicate resinous or foamed product.

Water-binding agents may be optionally added with the polyester silicate, activator and polyisocyanate to produce a rigid foamed polyurethane silicate product which is then wet with water to cure the water-binding agent.

The ratios of the essential reactants and optional reactants which lead to the polyurethane silicate resinous or foamed product of this invention may vary, broadly speaking, with ranges as follows:

(a) 1 to 95 parts by weight of polyester silicate resinous product;

(b) 50 parts by weight of polyisocyanate, polyisothiocyanate or isocyanate-terminated polyurethane prepolymer;
(c) up to 20% by weight of a foam stabilizer;
(d) up to 50% by weight of a chemically inert blowing agent, boiling within the range of from −25° C. to 80° C.;
(e) up to 10% by weight of an activator;
(f) up to 200 parts by weight of a water-binding agent;
(g) up to 100 parts by weight of a curing agent.

Percentages are based on the weight of the alkali metal polyester silicate resinous product and polyisocyanate.

In the cases where the viscosity of the polyisocyanate is too high, it may be reduced by adding a low-viscosity isocyanate, or even by adding inert solvents such as acetone, diethyl ether or diethylene glycol, ethyl acetate and the like.

In cases where the curing agent contains an aqueous alkali silicate, the isocyanate-terminated polyurethane prepolymer should be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3 to 100 milliequivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components in the production of polyurethane silicate so as to produce a tough, somewhat flexible solid or cellular solid concrete. The water-binding component may be added in amounts up to 200% by weight, based on the weight of Components A, B and C. When a water-binding agent is added and when the curing agent is an aqueous alkali metal silicate solution, a halogen or phosphorous-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684 to 710, of the type of cement which may used in the production of this invention and this description is incorporated herein by reference. Up to 300% by weight of a water-binding agent may be used with the unsaturated polyester silicate vinyl monomer, water up to 30% by weight based on the water-binding agent, and a peroxide initiator.

Organic blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with the components to be reacted with the polyisocyanate to produce a poly(urethane alkali silicate) prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compresed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The poly(urethane silicate) plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required to initiate foaming. The blowing agent may be added to the polyisocyanate.

Reinforcing elements may quite easily be incorporated into the reaction mixtures. The inorganic and/or organic reinforcing elements may be e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metalcovering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and high flame resistance. They have excellent sound-absorption capacity, heat-insulating capacity, fire resistance and heat resistance, which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reacting polyester silicate resinous product, optionally a blowing agent and initiator, and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire-resistance. The amount of water-binding component used varies greatly, depending on the type of product desired, from 1% to 200% by weight, based on Components A, B and C and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell-shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al, Fe, Cri and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components A, B and C in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluoroethylene, aliphatic and aromatic polyesters, melamine, urea, phenol resins, phenol silicate resins, polyacetal resins, polyepoxides, polyhydantoins, polyureas, polyethers, polyurethanes, polyimides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the poly(urethane silicate) resinous product is converted into a workable form which may be used as putties, coating agents, grouting materials or mortar. This thermoplastic form may also be injection-molded, extruded or worked-up in a kneader.

In many cases, the poly(urethane silicate) resinous and foamed products produced by the invention are soluble in organic solvents and may be used as a tough coating agent for wood and metal. The mixtures of the invention are also suitable for use as impregnating agents for finishing fibers. The mixtures may also be extruded through discs or slots and converted into fibers and foils. These fibers and foils may be used for producing synthetic incombustible paper or fleeces.

When the polyester silicate and polyisocyanate are combined with expanded clay and an alkali metal silicate solution, a very good concrete is obtained which can, for example, be used as panels in the construction field. In this case, the foam material (expanded clay) plays the part of the binding material.

An additional step may be taken wherein up to 10 parts by weight of an epihalohydrin, selected from the group consisting of epichlorohydrin, epibromohydrin, epifluorohydrin and mixtures thereof; and alkali catalyst, selected from the group consisting of sodium hydroxide, potassium hydroxide and mixtures thereof in an amount wherein the alkali metal radicals are about equal to the halide radicals; and 10 to 30 parts by weight of the polyester silicate resinous product of Claim 1 are mixed and reacted in a closed system at a temperature below the boiling temperature of the reactants, thereby producing an epoxy silicate resinous product. Then up to 10 parts by weight of an epoxy-curing catalyst, selected from the group consisting of a Lewis acid and an amine, are mixed and reacted at ambient temperature and pressure, thereby producing an epoxy silicate product. In some cases, it is better to elevate the pressure up to 45 psi in the production of epoxy silicate resinous products. The reaction time is 20 to 90 minutes. Epichlorohydrin is the preferred epihalohydrin.

The epoxy silicate resinous product may be cured by a catalyst such as amines, Lewis acids, alkali metal oxides or hydroxides, mercaptans, phenols, alcohols, aminosilicates with free amine groups, phenoplast, aminoplasts, phenoplast silicates, aminoplast silicates, polyamides, polyamide silicates and mixtures thereof. Up to 200 parts by weight of an epoxy-curing catalyst may be used with 100 parts by weight of the epoxy silicate resinous product.

Any suitable Lewis acid may be used in this invention. A "Lewis acid" is defined for the purpose of this invention as any electron-accepting material relative to the polymer to which it is complexed. Examples of Lewis acids are quinones, mineral acids, acid anhydrides, organic phosphonic acids, nitrophenols, metal halides, organic acids, and the like. Polycarboxyl acids and/or polycarboxyl acid anhydrides are the preferred Lewis acid.

Any suitable organic amine may be used as the epoxy-curing catalyst; however, polyamines are preferred. The alkylene polyamines are preferred which have the formula

$$NH_2(RNH)_nH$$

wherein R is an alkylene radical or a hydrogen-substituted alkylene radical, and n is an integer of at least one, there being no upper limit to the number of alkylene groups.

Other suitable polyamides which may be used in this invention include those organic materials possessing a plurality of amino hydrogen, e.g., a plurality of

groups wherein N is an amino nitrogen. These include the aliphatic, cycloaliphatic, aromatic or heterocyclic polyamines as well as derivatives thereof, as long as the derivatives still contain the necessary amino hydrogen.

Diethylenetriamine is the preferred epoxy-curing catalyst.

Polyhydric alcohols may be used with the substituted organic monohydroxy compound. They may be saturated, unsaturated or substituted. The polyhydric alcohol may be added in an amount up to 10 parts by weight.

Suitable polyhydric alcohols include, but are not limited to, ethylene glycol; propylene-1,2- and -1,3-glycol; butylene-1,4-and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as ε-caprolactone, or hydrocarboxylic acids such as ω-hydroxy-caproic acid. Polyethers containing 2 hydroxyl groups may be used in production of unsaturated polyester resins and may be prepared, e.g., by the polymerization of epoxides, e.g., ethylene oxide, propylene oxide, butylene oxide, tetrahydrofuran, styreneoxide or epichlorohydrin, each with itself, e.g., in the presence of $BF_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia; ethanolamine or ethylenediamine. The polyethers may be modified with vinyl polymers such as those which may be obtained by polymerizing styrene or acrylonitrile in the presence of polyethers.

Suitable unsaturated alcohols such as allyl alcohol may be reacted with dibasic acids such as phthalic anhydride, succinic acid, maleic acid, maleic anhydride, itaconic acid and fumaric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate and methallyl methacrylate may be used in this invention. Triallyl cyanurate may be reacted with unsaturated polyester resins to produce resins, and may be used as the polymerizing monomer.

Other unsaturated alcohols may be reacted with dibasic acids; these include other polymeric allyl-type alcohols which are alcohols having a double bond of aliphatic character between two carbon atoms, one of which is attached directly to a saturated carbon atoms, which, in turn, is attached directly to an alcoholic hydroxyl group, as represented by the general structural formula

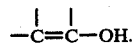

DESCRIPTION OF PREFERRED EMBODIMENTS

My invention will be illustrated in greater detail by the specific Examples which follow, it being understood that these preferred embodiments are illustrative of, but not limited to, procedures which may be used in the production of polyester silicate resinous products. Parts and percentages are by weight unless otherwise indicated.

EXAMPLE 1

About 10 parts by weight of sodium metasilicate pentahydrate, about 30 parts by weight of phthalic anhydride and 10 parts by weight of ethylene chlorohydrin are mixed, then heated to a temperature between the melting point of phthalic acid and the boiling point of ethylene chlorohydrin while agitating for 20 to 90 minutes. The temperature may then be gradually increased, up to 250° C., until the desired viscosity is obtained, thereby producing a cream-colored polyester silicate resinous product.

About 3 parts by weight of the phthalic anhydride may be replaced with 5 parts by weight of linseed oil for other polymerizable vegetable oils.

EXAMPLE 2

About 20 parts by weight of an aqueous solution of sodium silicate, containing 10 parts by weight of anhydrous sodium silicate, 30 parts by weight of phthalic acid and 15 parts by weight of ethylene chlorohydrin are mixed, then heated to a temperature between the melting temperature of phthalic acid and the boiling temperature of ethylene chlorohydrin while agitating for 20 to 90 minutes. The temperature is then gradually increased, up to 250° C., while agitating until the desired viscosity is obtained, thereby producing a polyester silicate resinous product.

About 3 parts by weight of the phthalic acid may be replaced with about 5 parts by weight of diethylene glycol bis (allyl carbonate).

EXAMPLE 3

About 10 parts by weight of potassium metasilicate pentahydrate, 5 parts by weight of phthalic anhydride, 15 parts by weight of maleic anhydride, and 10 parts by weight of ethylene chlorohydrin are mixed, then heated to a temperature between the melting temperature of the polycarboxyl acids and the boiling temperature of the ethylene chlorohydrin while agitating for 20 to 90 minutes, thereby producing polyester silicate resinous product. The temperature is then gradually increased, up to 250° C., while agitating until the desired viscosity is obtained. The resinous product may be produced as a thick liquid or a hard solid.

The thick liquid (viscosity of 500 to 1,500 poises) is mixed with styrene in the ratio of about 2 to 1 parts by weight. Then a catalytic amount of a peroxide initiator, methyl ethyl ketone peroxide (0.2 to 0.5 part by weight), and an activator, cobalt naphthenate (30 to 100 ppm of cobalt metal), are added and mixed at a temperature of 20° C. to 60° C., thereby producing a hard, solid condensation product. The above solution may be applied to a fiberglass cloth to produce rigid sheets and may be used to build containers, roofing, etc.

EXAMPLE 4

About 10 parts by weight of sodium metasilicate pentahydrate, 15 parts by weight of glycerol, 10 parts by weight of ethylene chlorohydrin and 30 parts by weight of phthalic anhydride are mixed, then heated to a temperature just below the boiling temperature of ethylene chlorohydrin for 20 to 90 minutes while agitating at ambient pressure, thereby producing a cream-colored polyester silicate resinous product.

A mineral acid, sulfuric acid, is then added slowly to the polyester silicate resinous product in the amount wherein the sulfuric acid and unreacted alkali metal radicals are about equal, while agitating, thereby producing a polyester silicate resinous product. This product is soluble in common solvents such as acetic acid and the solution of polyester silicate may be painted on wood to produce a tough, protective coating when dried.

Other polycarboxylic acids may be used in place of phthalic anhydride, such as phthalic acid, maleic acid, maleic anhydride, succinic acid, succinic anhydride, glutaric anhydride, glutaric acid, poly(adipic anhydride), adipic acid, tetrachlorophthalic anhydride, diglycolic anhydride, fumaric acid, azelaic acid, sebacic acid, terephthalic acid, oxalic acid, itaconic acid, nitrophthalic acid anhydride, pyromellitic anhydride, tetrahydrophthalic anhydride, dodecenylsuccinic anhydride, hexadecylsuccinic anhydride and mixtures thereof.

EXAMPLE 5

About 20 parts by weight of the polyester silicate resinous product, as produced in Example 1, 10 parts by weight of polypropylene glycol (mol. wt. 1200) and 20 parts by weight of "crude MDI" are mixed, then 1 part by weight of triethylenediamine is admixed thoroughly and the mixture expands 8 to 15 times its original volume, thereby producing a tough, semi-rigid polyurethane silicate foam with excellent fire-retardant properties.

Other polyols (polyhydroxyl organic compounds) may be used in place of polypropylene glycol, such as polyesters, polyethers, polyamides, polythioethers, polyacetals, polybutadiene, phenoplast and aminoplasts containing 2 or more hydroxyl radicals, castor oil, carbohydrates, cellulose, modified polyethers with vinyl compounds, and mixtures thereof.

EXAMPLE 6

About 20 parts by weight of the polyester silicate resinous product, as produced in Example 2, 4 parts by weight of trichlorotrifluoroethane, 0.5 part by weight of triethylenediamine and 15 parts by weight of a polyurethane prepolymer, as listed below, are thoroughly mixed at a temperature between ambient temperature and 45° C. The mixture expands 3 to 15 times its original volume, producing a rigid polyurethane silicate foam which has excellent flame-retardant and insulation properties. The foam may be used for packaging and for sound and thermal insulation.

| Example | Polyurethane prepolymer |
|---|---|
| a | Toluene diisocyanate with polypropylene glycol (mol. wt. 500) in an NCO/OH ratio of 25:1. |
| b | Diisocyanatodiphenylmethane with a tetrafunctional polypropylene glycol (mol. wt. 500) to produce a prepolymer having about 22% NCO groups. |
| c | Methylene bis-phenyl diisocyanate with a liquid polyepichlorohydrin to produce a prepolymer of NCO of about 16% and containing 25% by weight of a resin extender, polyalpha-methyl styrene. |
| d | Toluene diisocyanate with castor oil to produce a prepolymer with an NCO content of about 15%. |

EXAMPLE 7

About 10 parts by weight of sodium metasilicate, 5 parts by weight of glycerol, 5 parts by weight of linseed oil, 10 parts by weight of ethylene chlorohydrin, 5 parts by weight of sebacic acid and 20 parts by weight of phthalic anhydride are mixed in a container which is equipped with a reflux condenser, agitator, sparger, a foam breaker and has suitable means for sampling and discharge. The reaction may be carried out in an inert atmosphere, usually carbon dioxide or nitrogen. A vacuum may be applied to the reactor to remove the water. The mixture is heated to 100° C. to 250° C. while agitating for 20 to 90 minutes, thereby producing a polyester silicate resinous product.

EXAMPLE 8

About 10 parts by weight of sodium metasilicate pentahydrate, 10 parts by weight of ethylene chlorohydrin, 10 parts by weight of glycerol and 20 parts by weight of adipic acid are mixed, then heated to a temperature between the melting point of adipic acid and the boiling temperature of the components while agitating for 20 to 90 minutes, thereby producing a thick liquid polyester silicate resinous product.

About equal parts by weight of the polyester silicate resinous product and a polyisocyanate, as listed below, and 5% by weight of triethylamine are mixed at 30° C. to 45° C., then thoroughly agitated until the mixture begins to expand, thereby producing a rigid polyurethane silicate foam.

| Example | Polyisocyanate |
|---|---|
| a | Tolylene diisocyanate. |
| b | Tolylene diisocyanate ("TDI" produced by Olin Chemical). |
| c | "MDI" (polyphenyl-polymethylene-isocyanate). |
| d | "PAPI 27" produced by Upjohn Co. (a polyphenyl-polymethylene-isocyanate). |
| e | "Crude MDI" (a polyphenyl-polymethylene-isocyanate). |
| f | 20% solution of "TDI" residue in "crude MDI" with NCO content of about 30%. |
| g | Isocyanate-terminated reaction product of MDI with polyethylene glycol containing about 24% NCO. |
| h | A solution containing 80% "crude MDI" and 20% "TDI". |
| i | 4,4-diphenylmethane diisocyanate. |
| j | Sulphonated polyphenyl-polymethylene polyisocyanate, sulfur content of about 1% and NCO content of about 30%. |
| k | Tolylene diisocyanate silicate prepolymer (100 parts by weight of "TDI" with 10 parts by weight of hydrated silica). |
| l | Sodium silicate-tolylene diisocyanate prepolymer (100 parts by weight of "TDI" with 20 parts by weight of sodium metasilicate). |

EXAMPLE 9

About 10 parts by weight of the polyester silicate produced in Example 3, 5 parts by weight of an amine polyether sucrose (POLY G 71-357 produced by Olin), 5 parts by weight of methylene chloride, 15 parts by weight of "MDI" (polyphenylpolymethylene-isocyanate), 30 parts by weight of fine sand and 30 parts by weight of Portland cement are mixed thoroughly, then poured into a mold, such as a cement block mold, where the mixture expands 5 to 15 times its original volume and hardens within 5 minutes to produce a hard, rigid polyurethane silicate resinous product. After the product has hardened, it is then placed in water to wet the product thoroughly in order to cure any unreacted cement. The product has excellent flame-retardant properties and is a fine sound and thermal insulator.

Other water-binding agents may be used in place of Portland cement such as other hydraulic cements, synthetic anhydrides, gypsum, burnt lime and mixtures thereof.

EXAMPLE 10

About 30 parts by weight of the polyester silicate, as produced in Example 3, 10 parts by weight of methyl methacrylate, 0.2 to 0.5 part by weight of methyl ethyl ketone peroxide and sufficient cobalt naphthanate to produce 100 ppm are mixed at ambient pressure and at a temperature between 20° C. and 60° C., thereby producing a tough, solid polyester silicate resinous product.

EXAMPLE 11

About 30 parts by weight of the polyester silicate, as produced in Example 3, 10 parts by weight of styrene, 0.2 to 0.5 part by weight of methyl ethyl ketone, sufficient cobalt naphthanate to produce 100 ppm, 0.2 part by weight of a solution containing equal parts by weight of triethylenediamine and ethanolamine, 5 parts by weight of trichlorotrifluoroethane and 20 parts by weight of "crude MDI" are thoroughly mixed at ambient temperature up to 35° C. The mixture expands in a few seconds to 5 to 15 times its original volume, thereby producing a tough, rigid polyurethane silicate foam.

EXAMPLE 12

About 100 parts by weight of the polyester silicate resinous product produced in Example 3, 20 parts by weight of methyl methacrylate and 20 parts by weight of vinyl toluene are mixed, thereby forming a solution; then 0.2 to 0.5 part by weight of benzoyl peroxide, 0.5 part by weight of potassium persulfate, 0.001 part by weight of cupric sulfate, 0.01 part by weight of diethyl aniline, 20 parts by weight of methylene chloride, 300 parts by weight of Portland cement and 75 parts by weight of water are thoroughly mixed, then poured into a closed mold at a temperature just above the boiling temperature of methylene chloride. The mixture cures in 1 to 12 hours, thereby producing a foamed polyester silicate concrete product.

The foamed polyester silicate concrete product may be utilized for thermal and sound insulation, construction components, art objects, etc.

Other water-binding components may be used in place of Portland cement, such as other hydraulic cements, gypsum, burnt lime and synthetic anhydrite.

EXAMPLE 13

About 10 parts by weight of sodium metasilicate pentahydrate, 15 parts by weight of ethylene chlorohydrin, 15 parts by weight of phthalic anhydride and 5 parts by weight of linseed oil are mixed, then heated to a temperature between the melting point of phthalic anhydride and the boiling temperature of ethylene chlorohydrin while agitating for 20 to 90 minutes, thereby producing a polyester silicate resinous product.

The polyester silicate resinous product is soluble in organic solvents and may be used as a coating agent for wood or metal.

Other vegetable oils may be used in place of linseed oil, such as cottonseed oil, tung oil, fish oil, perilla oil, oiticica oil, sunflower oil, safflower oil, walnut oil, dehydrated castor oil, monoglyceride of vegetable oils and mixtures thereof.

EXAMPLE 14

About 100 parts by weight of the polyester silicate resinous product as produced in Example 3 and 30 parts by weight of styrene are mixed, thereby forming a solution, then 10 parts by weight of trichlorotrifluoroethane, 0.5 part by weight of a water-soluble polyester siloxane, 0.2 to 0.5 part by weight of methyl ethyl ketone peroxide, and sufficient cobalt naphthanate to produce about 100 ppm of cobalt in the mixture are added, thoroughly mixed and poured into a closed mold which has a temperature between 70° C. to 90° C. The mixture is cured in 30 minutes to 12 hours, thereby producing a foamed polyester silicate product.

The foamed polyester silicate product may be used for thermal and sound insulation.

EXAMPLE 15

About 100 parts by weight of the polyester silicate resinous product produced in Example 3, 20 parts by weight of styrene and 10 parts by weight of vinyl acetate are mixed, thereby forming a solution, then 0.2 to 0.5 part by weight of benzoyl peroxide, 0.01 part by weight of diethyl aniline, 200 parts by weight of Portland cement and 50 parts by weight of water are thoroughly mixed, then applied to layers of fiberglas to produce a polyester silicate concrete panel which cures in 1 to 12 hours. The panel may be used in construction, boat building, packaging, etc.

Other water-binding agents may be used in place of Portland cement, such as other hydraulic cements, gypsum, burnt lime and synthetic anhydrites.

EXAMPLE 16

About 10 parts by weight of fine granular sodium silicate ($Na_2O:SiO_2$ ratio of 1:2), 10 parts by weight of ethylene chlorohydrin, 5 parts by weight of glycerol, 15 parts by weight of phthalic anhydride and 5 parts by weight of adipic acid are mixed, then heated to a temperature between the melting temperature of phthalic anhydride and the boiling temperature of ethylene chlorohydrin while agitating at ambient pressure for 20 to 90 minutes, thereby producing a polyester silicate resinous product and salt.

Other polyhydroxy organic compounds (polyols) may be used in place of glycerol, such as ethylene glycol, propylene glycol diethylene ether glycol, butylene glycol, trimethylol propane, and mixtures thereof.

Other halohydrins may be used in place of ethylene chlorohydrin, such as ethylene bromohydrin, glycerol monochlorohydrin and mixtures thereof.

EXAMPLE 17

About 10 parts by weight of sodium silicate powder ($Na_2O:SiO_2$ ratio of 1:2), 10 parts by weight of 2-nitro-1-hydroxy propane, 5 parts by weight of glycerol, 10 parts by weight of phthalic anhydride and 5 parts by weight of dehydrated castor oil are mixed, then heated to a temperature just below the boiling temperature of 2-nitro-1-hydroxy propane while agitating at ambient pressure for 20 to 90 minutes, thereby producing a polyester silicate resinous product.

EXAMPLE 18

About 20 parts by weight of the polyester silicate resinous product as produced in Example 17, 5 parts by weight of epichlorohydrin and 3 parts by weight of caustic soda are mixed, then heated to a temperature just below the boiling temperature of epichlorohydrin while agitating at ambient pressure in a closed system for 20 to 90 minutes, thereby producing an epoxy silicate resinous product. About 100 parts by weight of the epoxy silicate resinous product are mixed with 20 parts by weight of diethylenetriamine and thoroughly mixed, then applied to fiberglas. The mixture hardens within 12 hours to produce a hard, tough epoxy silicate product which may be used as construction panels, to produce boats, etc.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of polyester silicate resinous product by mixing and reacting the following components:

(A) an alkali metal silicate, 1 to 10 parts by weight;

(B) an organic monohydroxy compound having a substituent which will split off during the reaction and the substituent radical is selected from the group consisting of halogen, acid sulfate, nitrate, acid phosphate, bicarbonate, sulfate, formate, acetate, propionate, laurate, oleate, stearate, and mixtures thereof, (C) a polycarboxylic acid and/or polycarboxylic acid anhydride, 10 to 30 parts by weight.

2. The process of claim 1 wherein the alkali metal silicate is selected from the group consisting of sodium silicate, potassium silicate, lithium silicate and mixtures thereof.

3. The process of claim 1 wherein the alkali metal silicate is sodium silicate.

4. The process of claim 1 wherein the substituted organic monohydroxy compound is an organic halohydrin.

5. The process of claim 1 wherein the substituted organic monohydroxy compound is ethylene chlorohydrin.

6. The process of claim 1 wherein up to 10 parts by weight of a polyhydric alcohol is mixed and reacted with components A, B and C.

7. The process of claim 6 wherein the polyhydric alcohol is selected from the group consisting of ethylene glycol, propylene glycol, butylene glycol, trimethylene glycol, tetramethylene glycol, pentamethylene glycol, hexamethylene glycol, diethylene glycol, polyethylene glycol, polypropylene glycol, bis($\beta$-hydroxyethyl) terephthalate, Bisphenol A, resorcinol, glycerol, glycerol monochlorohydrin, trimethol ethane, and carbohydrates.

8. The process of claim 1 wherein the polycarboxylic acid is selected from the group consisting of maleic acid, phthalic acid, succinic acid, oxalic acid, malonic acid, glutaric acid, adipic acid, pimelic acid, suberic acid, isophthalic acid, fumaric acid, azelaic acid, sebacic acid, terephthalic acid, itaconic acid, diglycolic acid, tartaric acid, and mixtures thereof.

9. The process according to claim 1 wherein up to 5 parts by weight of the polycarboxylic acid and/or polycarboxylic acid anhydride is replaced with a polymerizable oil, selected from the group consisting of soybean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

10. The process according to claim 1 wherein up to 5 parts by weight of the polycarboxylic acid and/or polycarboxylic acid anhydride is replaced with a linear organic carbonate selected from the group consisting of p-xylene glycol bis(ethyl carbonate), diethylene glycol bis(allyl carbonate) and mixtures thereof.

11. The process according to claim 1 wherein up to 5 parts by weight of the organic monohydroxy compound having a substituent which will split off during the reaction and polycarboxylic acid is replaced with an organic compound containing hydroxyl and carboxylic radicals, selected from the group consisting of 10-hydroxyl undecanoic acid, 2 hydroxy decanoic acid, $\omega$-hydroxypentadecanoic acid and mixtures thereof.

12. The product produced by the process of claim 1.

13. The product produced by the process of claim 7.

14. The product produced by the process of claim 9.

15. The product produced by the process of claim 10.

16. The product produced by the process of claim 11.

17. The process according to claim 1, wherein an additional step is taken wherein a catalytic amount of a peroxide initiator selected from the group consisting of acetyl benzoyl peroxide, peracetic acid methyl ethyl ketone peroxide, cyclohexanone peroxide, cyclohexyl hydroperoxide, 2,4-dichlorobenzoyl peroxide, cumene hydroperoxide, tert-butyl hydroperoxide, methyl amyl ketone peroxide, lauroyl peroxide, benzoyl peroxide, tert-butyl perbenzoate, p-chlorobenzoyl peroxide, dibenzal diperoxide and mixtures thereof is admixed with the polyester silicate resinous product.

* * * * *